United States Patent [19]
Dissett

[11] Patent Number: 5,885,181
[45] Date of Patent: Mar. 23, 1999

[54] HELICAL GEAR DIFFERENTIAL INCLUDING LUBRICATION PASSAGE MEANS

[75] Inventor: Walter L. Dissett, Farmington Hills, Mich.

[73] Assignee: Tractech Inc., Warren, Mich.

[21] Appl. No.: 902,477

[22] Filed: Jul. 29, 1997

[51] Int. Cl.[6] .................................................. F16H 1/45
[52] U.S. Cl. ............................................................. 475/160
[58] Field of Search ............................................. 475/160

[56] References Cited

U.S. PATENT DOCUMENTS

| | | |
|---|---|---|
| 3,706,239 | 12/1972 | Myers . |
| 4,365,524 | 12/1982 | Dissett et al. . |
| 4,625,585 | 12/1986 | Dissett . |
| 4,677,876 | 7/1987 | Dissett . |
| 4,751,853 | 6/1988 | Dissett . |
| 5,221,238 | 6/1993 | Bawk et al. . |
| 5,295,923 | 3/1994 | Takefuta ................... 475/160 |
| 5,620,389 | 4/1997 | Sato ........................ 475/160 |
| 5,624,344 | 4/1997 | Yehl et al. ................ 475/160 |
| 5,669,844 | 9/1997 | Homan et al. ............ 475/160 |
| 5,711,737 | 1/1998 | Teraoka et al. .......... 475/160 |
| 5,735,765 | 4/1998 | Teraoka et al. .......... 475/160 |

OTHER PUBLICATIONS

"UltraGlow Ion Nitriding", Advanced Heat Treat Corp., Waterloo, IA 50703.

*Primary Examiner*—Dirk Wright
*Attorney, Agent, or Firm*—Laubscher & Laubscher

[57] ABSTRACT

A helical gear differential includes lubrication passages for circulating lubricating oil to the helical pinion counter bores and the side gear counter bores, thereby to increase the operating life of, and to reduce the operating noise level of, the differential. Openings contained in one of the housing and cover sections introduces lubricating oil into the ends of the associated pinion bores to lubricate the ends of the adjacent pinions, and the oil flows through the housing openings to lubricate the remote ends of the pinions. The adjacent ends of the other pinions are lubricated via second housing openings contained in the walls of housing relieved portions. An improved retaining means including a plate and a split snap ring serve to retain the cross pin spacer member within a transverse bore contained in the housing body section.

11 Claims, 4 Drawing Sheets

HELICAL GEAR DIFFERENTIAL INCLUDING LUBRICATION PASSAGE MEANS

BACKGROUND OF THE INVENTION

1. Field of the Invention

This invention relates to an improved helical gear differential including lubrication passage means for supplying lubricating oil from the differential casing to the ends of the helical pinion gears and the side gears, thereby to increase the operating life and durability of the differential. An improved cross pin spacer arrangement is provided that affords easy, quick and inexpensive assembly of the differential on a vehicle production line.

2. Brief Description of the Prior Art

Helical gear differentials are well known in the patented prior art, as evidenced by the patents to Myers U.S. Pat No. 3,706,239, Dissett U.S. Pat Nos. 4,625,585, 4,677,876, and 4,751,853, Dissett et al U.S. Pat No. 4,365,524, and Bawks et al U.S. Pat No. 5,221,238. These differentials include pairs of longitudinally offset helical pinions that are mounted with an outside diameter running fit in the pinion cavities and which are in enmeshing engagement at their adjacent ends, the remote ends of the pinions being in enmeshing engagement with the side gears, respectively. The transverse forces caused by the gear tooth loadings on the pinions cause an inherent frictional resistance at the outside diameter fit, thus introducing an inherent torque bias that is proportional to the transverse gear tooth loading, which in turn is proportional to the torque transmitted through the differential assembly. The helix angle of the gears introduces an axial thrust on the respective differential pinions causing a frictional drag owing to the frictional engagement of the axial ends of the pinions with the bottom wall surfaces of the pinion cavities of the differential carrier housing.

The friction produced by the reaction forces on the housing at the axial ends of the meshing pinions is created by the thrust forces of the helix angle of the gears. These friction forces on the housing complement the friction forces created by reason of the sliding contact of the addendum surfaces of the pinions on the circular walls of the pinion cavities. The friction forces can be varied by altering the diameter of the pinions, their circular pitch, or their helix angles, thereby providing parameters that can be varied to suit several particular design requirements. Also, the number of pairs of pinions may be increased, if desired, to add to the torque capacity of the differential. The thrust forces produced at the ends of the helical pinions and the side gears tend to stress and produce wear on the adjacent housing support surfaces, thereby adversely affecting the operation of the differential, and reducing its operating life. Furthermore, the housings of the known helical gear type differentials are relatively bulky and heavy, thereby increasing the cost of the differential and the installation thereof. Also, the known helical gear differentials have a relatively high noise level in operation.

It is conventional in such helical gear differentials to provide cross pin spacer means than extend transversely between the ends of the output shafts or axles that are driven by the differential, thereby to prevent axial displacement of the shafts toward each other. These cross pin spacer means are installed after the C-clip retainers are connected with the output shafts to prevent axial separation of the shafts relative to the differential. The known cross pin spacer means are generally of rather complicated construction, and are difficult and expensive to install.

The present invention was developed to avoid the above and other drawbacks of the known types of helical gear differentials.

SUMMARY OF THE INVENTION

Accordingly, it is a primary object of the invention to provide a helical gear differential containing lubrication passage means for circulating lubricating oil from the differential casing to the end surfaces of the helical pinions and the side gears, thereby to improve the operating life and durability of the differential.

According to a more specific object of the invention, the lubrication passage means include recesses formed in the outer periphery of the differential housing, thereby to reduce the weight and cost of the materials of the apparatus.

A further object of the invention is to provide lubrication means for helical gear differential to produce a significant reduction in the noise level during operation.

A further object of the invention is to provide an improved cross pin spacer assembly in which the cross pin in retained in place by a simple retaining plate and split snap ring, thereby simplifying and reducing the time and cost of installation.

Another object of the invention is to provide a differential designed to strict weight limitations without sacrificing durability. A thin wall steel body construction is utilized together with a final ion nitriding heat treating step to provide a housing of maximum strength, together with minimum weight and distortion. Close tolerance steel forgings are utilized for both the flange and plain cover sections, thereby minimizing machining and maximizing strength. By not heat treating or by localized heat treatment of the covers, the components can be completely machined prior to final assembly. No further machining is required. Preferably, the helical gears are formed from conventional 8620H steel that is carburized and hardened, and will withstand maximum torque transmission. Particular attention has been given to the lubrication of the end surfaces of the helical pinion and the side gears.

BRIEF DESCRIPTION OF THE DRAWINGS

Other objects and advantages of the invention will become apparent from a study of the following specification when viewed in conjunction with the accompanying drawings, in which.

DETAILED DESCRIPTION

Figure 1:
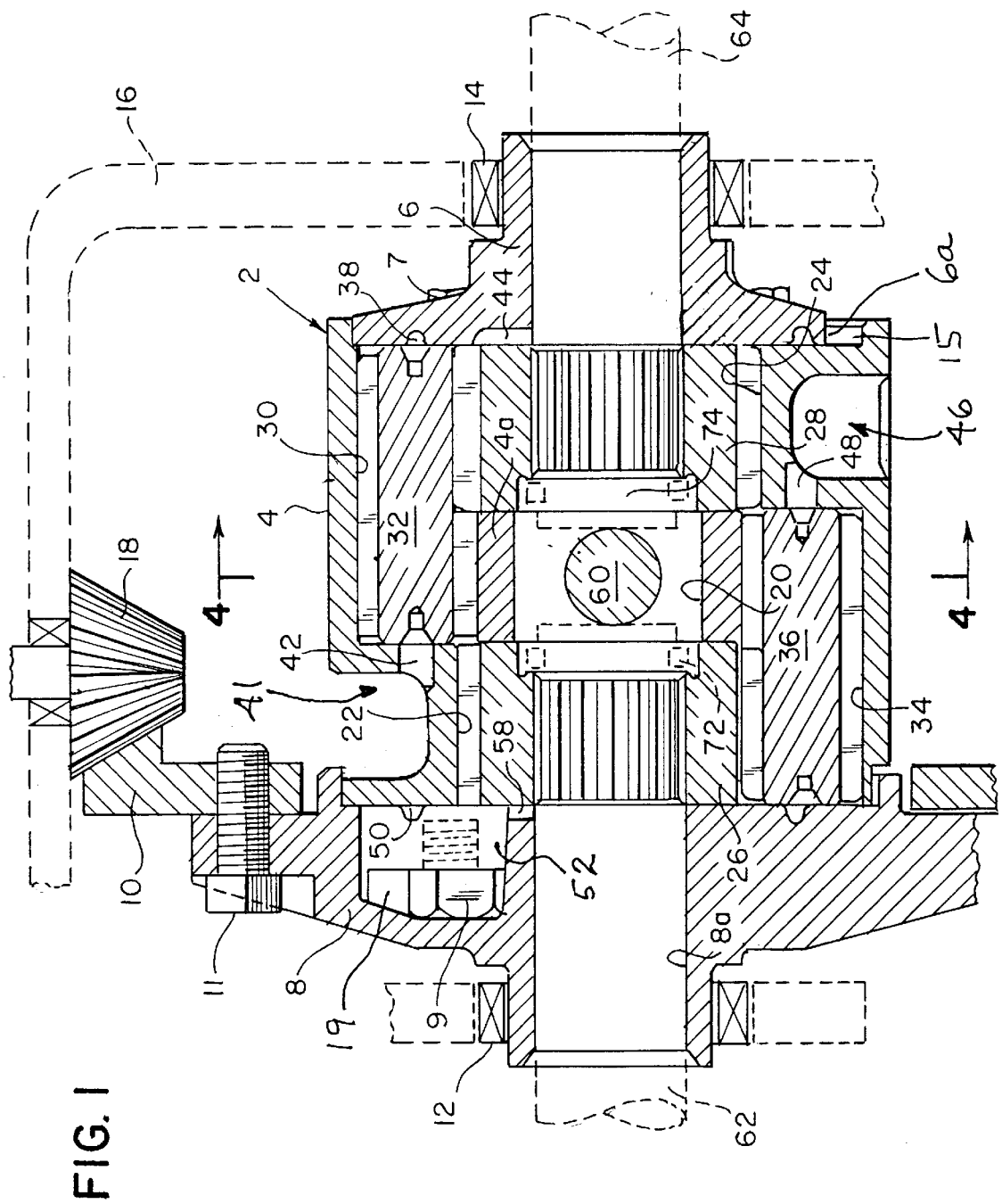
FIG. 1 is a longitudinal sectional view of the improved helical gear differential of the present invention taken along line 1—1 of FIG. 2.

Referring first more particularly to FIG. 1, helical gear differential 2 of the present invention includes a central body section 4, a plain end cover section 6, and a flanged end cover section 8 to which a ring gear 10 is bolted by bolts 11. As is conventional in the art, the differential is supported by fixed bearing means 12 and 14 for driven rotation within the oil-containing differential casing 16 when the ring gear 10 is driven by the drive pinion 18. The housing section 4 is provided with a longitudional through bore 20 the opposite ends of which are provided with counter bores 22 and 24 for receiving the side gears 26 and 28, respectively. The right hand end of the body section is provided with counter bores 30 that receive the helical pinions 32, and the left hand end of the central body section 4 is provided with counter bores 34 that receive the helical pinions 36. As is conventional in the art, the remote ends of the pinions 32 and 36 engage the side gears 28 and 26, respectively, and the adjacent ends of the helical pinion pairs are in meshing engagement with each other.

As shown in FIG. 1, the right hand end of the housing section 4 is counter bored to receive the associated end of the plain end cover 6, and the end surface of the flanged cover member 8 is counter bored to receive the adjacent end of the housing section 4. The plain and flanged cover end sections 6 and 8 are bolted to the center housing section by bolts 7 and 9, having head portions contained in cover section counter bores 17 and 19 respectively.

Figure 2:
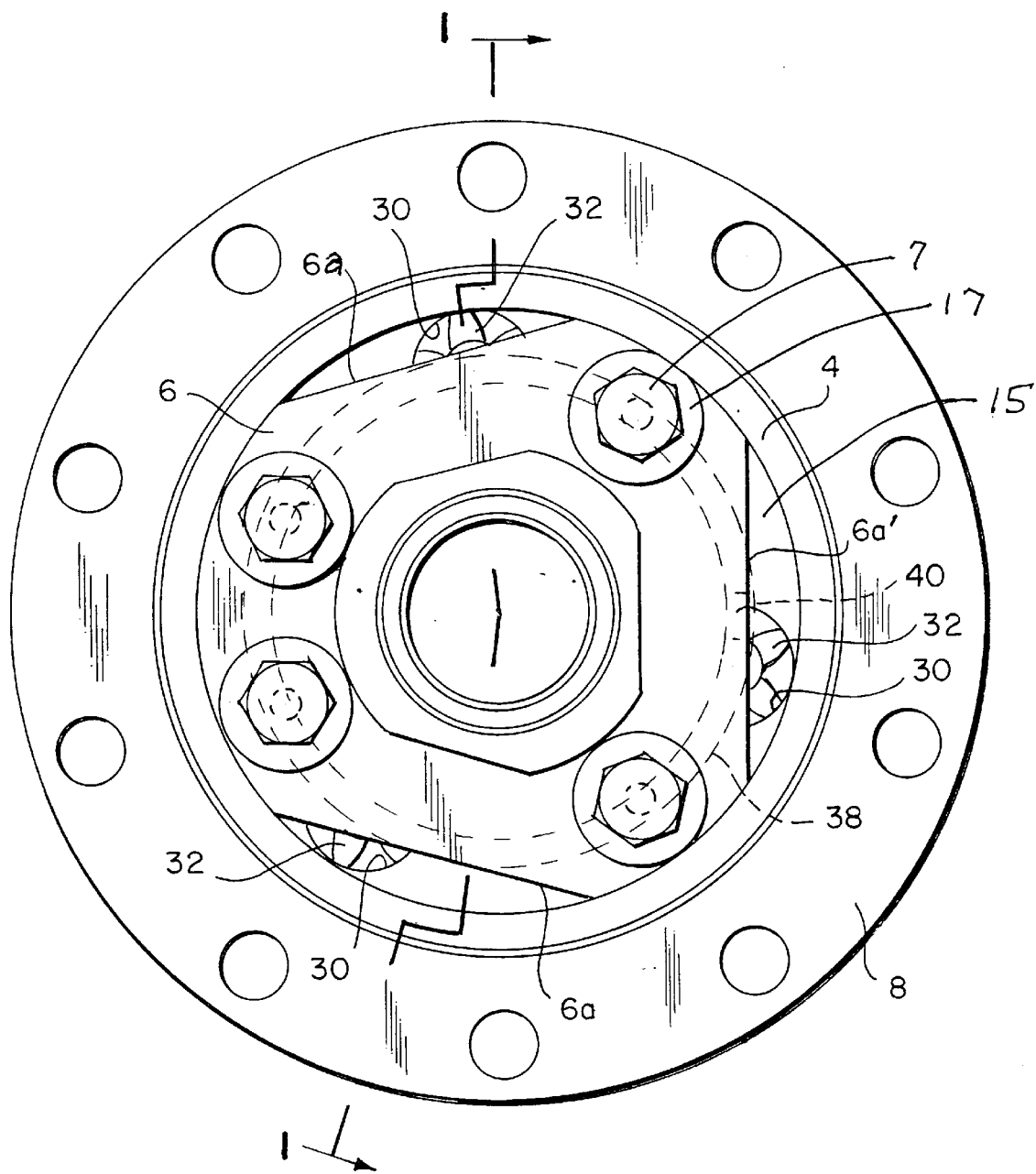
FIGS. 2 and 3 are right hand and left hand views, respectively, of the differential of FIG. 1.

Referring to FIG. 2, it will be seen that the plain end cover section 6 is provided on its periphery with relieved portions that define flat end surfaces 6a, thereby to define cover end openings 15 through which oil contained in the casing 16 is introduced within the adjacent ends of the associated pinion counter bores 30. The end face of the plain end cover 6 contains a first circular groove 38 that communicates with the end surface 6a' via radial opening 40, as shown in FIG. 2. Thus, lubricating oil is circulated to the ends of the first pinions 32 via the cover openings 15 defined by flat surfaces 6a, the radial passage 40, and the circular groove 38. At the other end of the counter bores 30, lubricating oil is introduced from the casing 16 via recesses 41 contained in the outer periphery of the body section, and first housing openings 42, thereby lubricating the other ends of the first helical pinions 32. Furthermore, fluid in the counter bores 30 is supplied to the counter bore 24 via radial channel 44 provided in the plain cover section 6, thereby to lubricate the adjacent end of side gear 28.

Figure 3:
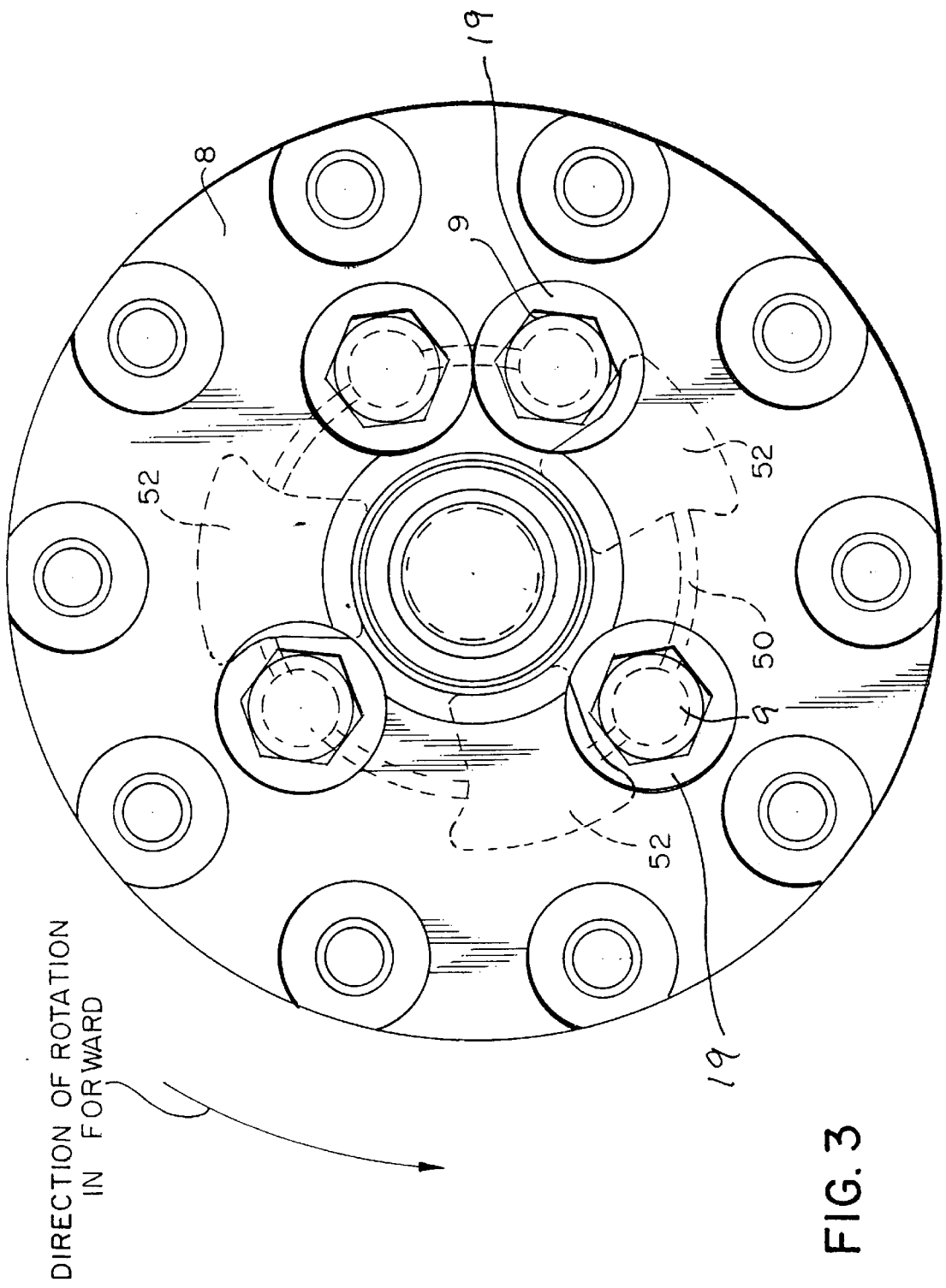

Similarly, lubricating fluid is supplied to one end of counter bore 34 via second peripheral recesses 46 contained in the housing body 4, and second housing openings 48, thereby to lubricate the adjacent end of the second pinions 36. At the other end, lubricating fluid is supplied from counter bore 34 to a second circular groove 50 contained in the end face of the flanged end cover 8 via radial grooves 52, (FIG. 3) thereby to lubricate the adjacent ends of the helical pinions 36. Furthermore, lubricating oil is fed radiantly inwardly via the radial passage 58 to lubricate the adjacent end face of side gear 26.

Figure 4:
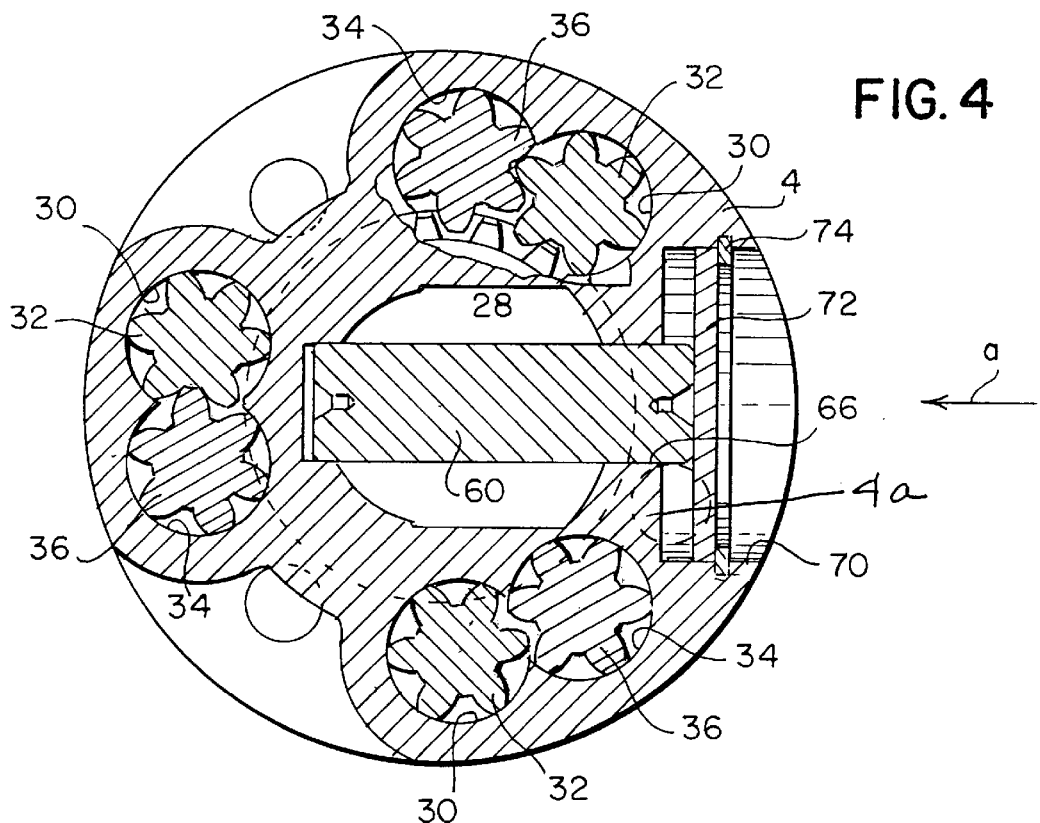
FIG. 4 is a sectional view taken along line 4—4 of FIG. 1.

As shown in FIG. 1, the counter bores 24 and 22 define a transverse housing wall 4a that supports the adjacent ends of the side gears 26 and 28, respectively. The cross pin spacer member 60 that supports the adjacent ends of the output shafts or axles 62 and 64 is inserted within a corresponding transverse bore 66 contained in the housing transverse wall portion 4a, as shown in FIG. 4. The housing 4 is provided with a counter bore 70 that defines an access opening for introducing the conventional C-clip retainers 72 and 74 (FIG. 1), as will be described in greater detail below. The cross pin spacer element 60 is retained in its transverse bore 66 by a retaining plate 72 that is maintained in place by the split snap ring 74 that cooperates with a corresponding groove contained in the wall of the counter bore 70.

OPERATION

Figure 5:
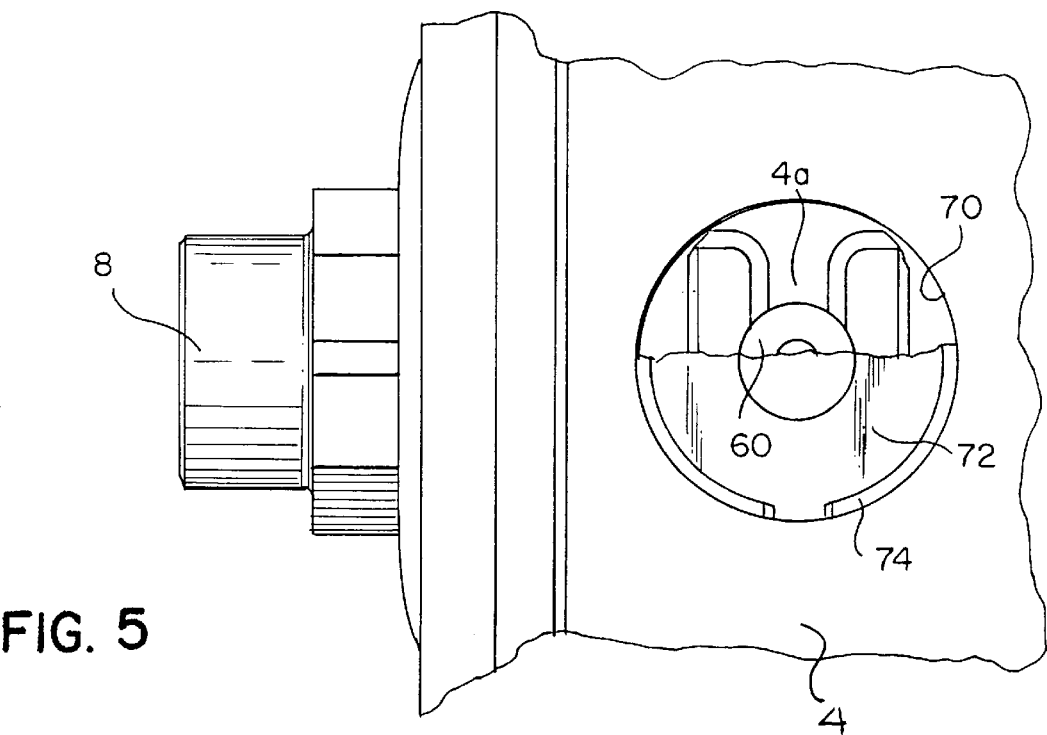
FIG. 5 is a detailed side elevation view taken in the direction of the arrow "a" in FIG. 4.

Assuming that the cross pin 60, retaining plate 72, and snap ring 74 are removed, the adjacent ends of the output shafts 62 and 64 are introduced through the through bores 8a and 6a of the end cover sections 8 and 6, respectively, and in splined relation through the bores of the side gears 26 and 28, respectively. The C-clip retainers are then inserted into the corresponding grooves contained in the adjacent ends of the output shafts 62 and 64, respectively, via the access openings provided by the counter bore 70 (FIG. 5). The output shafts 62 and 64 are then displaced apart until the C-shaped snap rings 72 and 74 engage the adjacent opposed surfaces of the side gears 26 and 28, respectively. The cross pin 60 is then introduced into the transverse bore 66 to serve as a spacer between the adjacent ends of the output shafts 62 and 64, as shown in FIG. 1.

Upon rotation of the differential housing 2 by the cooperation between drive pinion 18 and ring gear 10, the differential housing is rotated in its fixed bearings 12 and 14 to drive the output shafts via helical pinions 32 and 36 and side gears 26 and 28, respectively. The output shafts 62 and 64 are normally driven at the same speed, since the drive torque applied to the ring gear 10 is distributed through 2 parallel torque delivery paths which include the meshing pairs of differential pinions 32 and 36, thereby introducing radial gear tooth loading on the pinions, which results in frictional resistance owing to rotation, thus introducing an inherent bias torque. When one side gear 26 or 28 applies more resistance to the torque driving the pinion (due to similar ground coefficient), its mating pinions tend to separate from the side gear and wedge into the pockets in the housing. As the input torque increases, the wedging of the pinions in the housing also increases. As the coefficient friction under each of the drive wheels varies, the amount of torque distributed to each wheel is automatically proportioned so that wheel slip under the tire with a poor traction will be controlled. Lubricating oil contained in the casing 16 is supplied to one end of the first pinions 32 via the housing openings 15 defined by the flat surfaces 6a on the end section 6, radial passage 40, and circular groove 38. The circular groove 38 has a radius that corresponds with the radius of the center lines of the helical pinions. Lubricating oil is supplied to the other ends of the counter bores 30 to lubricate the adjacent ends of the helical pinions 32 via first housing openings 42. Similarly, lubricating oil is introduced into the second counter bores 34 via second housing opening 48, thereby to lubricate the adjacent ends of the helical pinion 36. Fluid is supplied to the other ends of the pinions 36 via radial grooves 52 (FIG. 3) and circular groove 50, the radius of which corresponds with the radius of the longitudional axis of the helical pinions 36.

Preferably, close tolerance steel forgings are utilized for both the flange end cover 8 and the plain end cover 6, thereby to minimize machining and maximize strength. In order to achieve strict weight limitations without sacrificing durability, the body section 4 includes the latest technology to allow for design flexibility and service ability. Preferably, the thin wall steel center body construction is heat treated for maximum strength and minimum weight. A suitable process for hardening the housing body is the ULTRAGLOW ion nitriding process marketed by Advanced Heat Treat Corp. of Waterloo, Iowa.

While in accordance with the provisions of the Patent Statutes, the preferred forms and embodiments of the invention have been illustrated and described above, it will be apparent to those skilled in the art that changes may be made without deviating from the inventive concepts set forth above.

What is claimed is:

1. A helical gear type differential apparatus for supplying driving torque from a drive shaft to a pair of aligned output shafts, comprising:

(a) a differential carrier housing adapted to be rotatably driven by the drive shaft within an oil-containing casing, said housing being sectional and including:
   (1) a generally cylindrical body section containing a longitudinal through bore, said body section including a pair of end portions having end surfaces containing side gear counter bores coaxial with said longitudinal bore, respectively, thereby to define a transverse wall containing said longitudinal bore;
   (2) a pair of end cover sections connected with the ends of said body section to close said counter bores, respectively, said end cover sections containing aligned output shaft openings coaxial with said longitudinal bore, said end cover sections having inner cover surfaces in engagement with said body end surfaces; and
   (3) said body section transverse wall also containing a transverse bore that extends from the outer periphery of the body section diametrically across said longitudinal bore;
(b) a pair of annular helical side gears journalled in said side gear counter bores, respectively, said side gears having splined inner surfaces for non-rotatable connection with the output shafts when the adjacent ends of the shafts extend in axially spaced relation through said cover output shaft openings, respectively;
(c) a plurality of pairs of parallel longitudinally offset helical pinions having threads of opposite pitch, respectively, the pinions of each pair being mounted with an outside diameter running fit within corresponding pairs of circumferentially arranged pinion bores contained in said body member end surfaces, respectively, the adjacent ends of said pinion bores being in communication with each other and with the associated side gear counter bore, and the adjacent ends of said differential helical pinions being in overlapping enmeshing engagement with each other, said pinions having longitudinal axes parallel with the axes of, and being in enmeshing engagement with, said side gears, respectively, whereby the torque transmitted through said differential mechanism introduces gear tooth loads on said pinions which cause a frictional torque resistance as said pinions rotate within their respective pinion cavities, thereby introducing a torque bias in the differential mechanism;
(d) cross pin spacer means contained in said transverse housing wall and extending diametrically across said longitudinal bore for supporting the adjacent ends of the output shafts against the reaction forces developed during operation of the differential, said cross pin spacer means including a cross pin mounted in said transverse bore, and retaining means for retaining said cross pin in said transverse bore; and
(e) means for circulating lubricating oil from said casing to said pinion counter bores and to said side gear counter bores, thereby to lubricate the end surfaces of said pinion gears and said side gears.

2. Apparatus as defined in claim 1, wherein said transverse bore is counter bored adjacent the periphery of said housing body section to define an access opening; and further wherein said retaining means includes a circular retaining plate extending transversely across said retaining counter bore, and split snap-ring means for retaining said plate in said retaining counter bore.

3. A helical gear type differential apparatus for supplying driving torque from a drive shaft to a pair of aligned output shafts, comprising:

(a) a differential carrier housing adapted to be rotatably driven by the drive shaft within an oil-containing casing, said housing being sectional and including:
   (1) a generally cylindrical body section containing a longitudinal through bore, said body section including a pair of end portions having end surfaces containing side gear counter bores coaxial with said longitudinal bore, respectively, thereby to define a transverse wall containing said longitudinal bore; and
   (2) a pair of end cover sections connected with the ends of said body section to close said counter bores, respectively, said end cover sections containing aligned output shaft openings coaxial with said longitudinal bore, said end cover sections having inner cover surfaces in engagement with said body end surfaces;
(b) a pair of annular helical side gears journalled in said side gear counter bores, respectively, said side gears having splined inner surfaces for non-rotatable connection with the output shafts when the adjacent ends of the shafts extend in axially spaced relation through said cover output shaft openings, respectively;
(c) a plurality of first and second pairs of parallel longitudinally offset helical pinions having threads of opposite pitch, respectively, the pinions of each pair being mounted with an outside diameter running fit within corresponding pairs of circumferentially arranged pinion bores contained in said body member end surfaces, respectively, the lengths of said pinion bores being less than the length of said body section, the adjacent ends of said pinion bores being in communication with each other and with the associated side gear counter bore, the adjacent ends of said differential helical pinions being in overlapping enmeshing engagement with each other, said pinions having longitudinal axes parallel with the axes of, and being in enmeshing engagement with, said side gears, respectively, whereby the torque transmitted through said differential mechanism introduces gear tooth loads on said pinions which cause a frictional torque resistance as said pinions rotate within their respective pinion cavities, thereby introducing a torque bias in the differential mechanism, the peripheral surface of said body section containing recesses (41, 46) that extend radially inwardly opposite and spaced from the ends of the bottom walls of each of said pairs of pinion bores, respectively;
(d) cross pin spacer means contained in said transverse housing wall and extending diametrically across said longitudinal bore for supporting the adjacent ends of the output shafts against the reaction forces developed during operation of the differential; and
(e) means for circulating lubricating oil from said casing to said pinion counter bores and to said side gear counter bores, thereby to lubricate the end surfaces of said pinion gears and said side gears, said oil lubricating means including housing openings (42, 48) affording communication between said recesses and the bottom of said pairs of pinion bores, respectively.

4. A helical gear differential apparatus as defined in claim 3, wherein said oil circulating means includes a plurality of cover openings (15) contained in one of said cover sections (6) opposite at least a portion of each of the associated first pairs of pinion counter bores, thereby to introduce oil into the adjacent ends of said associated first pairs of pinion counter bores.

5. A helical gear differential apparatus as defined in claim 4, wherein the end surface of said housing associated with said one cover section is counter bored to receive said one cover section, and further including first bolt means (7) for bolting said one cover section with said body member.

6. A helical gear differential apparatus as defined in claim 5, wherein said one cover section contains on its outer periphery a plurality of circumferentially arranged flat portions (6a) defining said cover openings.

7. A helical gear differential apparatus as defined in claim 6, wherein said one cover section contains on its surface adjacent said body member a first annular lubricating groove (38) the radius of which corresponds generally with the radial distance between the longitudinal axes of said pinions and the longitudinal axis of said body member, said annular grove being in communication with at least one of said cover opening flat portions, thereby affording circulation of lubricating oil to the adjacent end faces of the associated first pinion gears contained in said first counter bores.

8. A helical gear differential apparatus as defined in claim 7, wherein the face of said first cover member adjacent said housing member includes adjacent its inner circumference a radial channel (44) for supplying lubricating oil from said first pinion counter bores to the adjacent end face of the associated side gear.

9. Apparatus as defined in claim 8, wherein the other cover section (8) has an end face adjacent said body section that contains:

(a) a second annular groove (50) the radius of which corresponds generally with the radial distance between the axes of said second pairs of pinion gears and the longitudinal axis of said body section; and (b) means including a through opening (19) and at least one radial groove (52) communicating with said second annular groove for supplying lubricating oil from said casing to said second annular groove.

10. Apparatus as defined in claim 9, wherein said other cover section contains an annular external flange portion adapted for connection with a differential ring gear, said other cover section being counterbored to receive the associated end of said housing body section.

11. Apparatus as defined in claim 3, wherein at least the housing body section is hardened by ion nitriding.

* * * * *